US010128511B2

(12) United States Patent
Jung et al.

(10) Patent No.: US 10,128,511 B2
(45) Date of Patent: Nov. 13, 2018

(54) CATHODE FOR METAL-AIR BATTERY, METHOD OF MANUFACTURING THE SAME, AND METAL-AIR BATTERY COMPRISING THE SAME

(71) Applicant: KOREA INSTITUTE OF ENERGY RESEARCH, Daejeon (KR)

(72) Inventors: Kyu-nam Jung, Daejeon (KR); Jong-won Lee, Daejeon (KR); Kyung-hee Shin, Daejeon (KR); Chang-soo Jin, Daejeon (KR); Bum-suk Lee, Daejeon (KR); Myung-seok Jeon, Daejeon (KR); Jae-deok Jeon, Daejeon (KR); Sun-hwa Yeon, Daejeon (KR); Joon-mok Shim, Daejeon (KR); Jung-hoon Yang, Daejeon (KR)

( * ) Notice: Subject to any disclaimer, the term of this patent is extended or adjusted under 35 U.S.C. 154(b) by 0 days.

(21) Appl. No.: 14/889,144

(22) PCT Filed: Dec. 5, 2014

(86) PCT No.: PCT/KR2014/011893
§ 371 (c)(1),
(2) Date: Nov. 4, 2015

(87) PCT Pub. No.: WO2016/088923
PCT Pub. Date: Jun. 9, 2016

(65) Prior Publication Data
US 2017/0271684 A1    Sep. 21, 2017

(30) Foreign Application Priority Data

Dec. 4, 2014  (KR) ........................ 10-2014-0172844

(51) Int. Cl.
*H01M 4/86*  (2006.01)
*H01M 12/08*  (2006.01)
(Continued)

(52) U.S. Cl.
CPC ......... *H01M 4/8817* (2013.01); *H01M 4/382* (2013.01); *H01M 4/8657* (2013.01);
(Continued)

(58) Field of Classification Search
None
See application file for complete search history.

(56) References Cited

U.S. PATENT DOCUMENTS 9,356,295 B2    5/2016  Lee et al.
9,478,801 B2   10/2016  Kong et al.
(Continued)

FOREIGN PATENT DOCUMENTS

JP    2013-080675    5/2013
JP    2014-086256    5/2014
(Continued)

OTHER PUBLICATIONS

English translation of 2014-0105100.
(Continued)

*Primary Examiner* — Jonathan Crepeau
(74) *Attorney, Agent, or Firm* — Antonio Ha & U.S. Patent, LLC

(57) ABSTRACT

The present invention relates to a cathode for a metal-air battery, a method for manufacturing the same, and a metal-air battery including the same. The cathode comprises a needle-shaped core including two or more species of metals selected from the group consisting of nickel, cobalt, manganese, zinc, iron, copper, and chrome, or a cobalt oxide; and a flake-shaped shell including an oxide containing two or more species of metals selected from the group consisting of nickel, cobalt, manganese, zinc, iron, copper, and chrome or a cobalt oxide. As such, the core-shell structure may lead to a reduction in the charge voltage of the metal-air battery as well as the taking of the good capacity characteristics of
(Continued)

the transition metal oxide. Further, according to the present invention, the cathode for a metal-air battery may be produced without adding carbon or binder.

3 Claims, 3 Drawing Sheets

(51) Int. Cl.
  *H01M 4/88* (2006.01)
  *H01M 4/38* (2006.01)
  *H01M 4/90* (2006.01)
(52) U.S. Cl.
  CPC ....... *H01M 4/8875* (2013.01); *H01M 4/8892* (2013.01); *H01M 4/9016* (2013.01); *H01M 12/08* (2013.01); *H01M 2004/8689* (2013.01); *Y02E 60/128* (2013.01)

(56) References Cited

U.S. PATENT DOCUMENTS

2005/0255339 A1  11/2005  Tsai et al.
2014/0113190 A1*  4/2014  Kong .................... H01M 4/366
                                                                 429/212

FOREIGN PATENT DOCUMENTS

| KR | 10-2004-0094710 | 11/2004 |
| KR | 10-2014-0049868 | 4/2014 |
| KR | 2014-0105100 | 9/2014 |
| KR | 10-2014-0126805 | 11/2014 |

OTHER PUBLICATIONS

English translation of 2014-086256.
English translation of 10-2004-0094710.
English translation of 10-2014-0049868.
English translation of 10-2014-0126805.
English translation of 2013-080675.

\* cited by examiner

[Fig. 1]
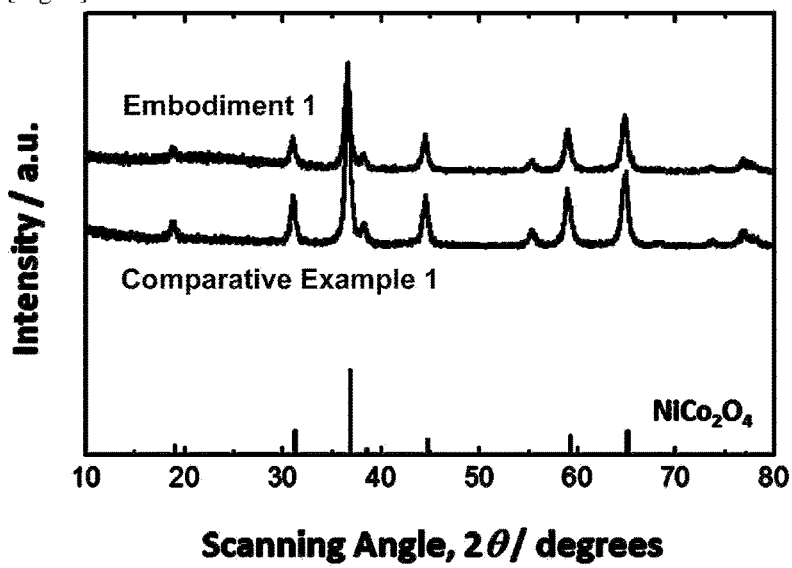
[Fig. 2]
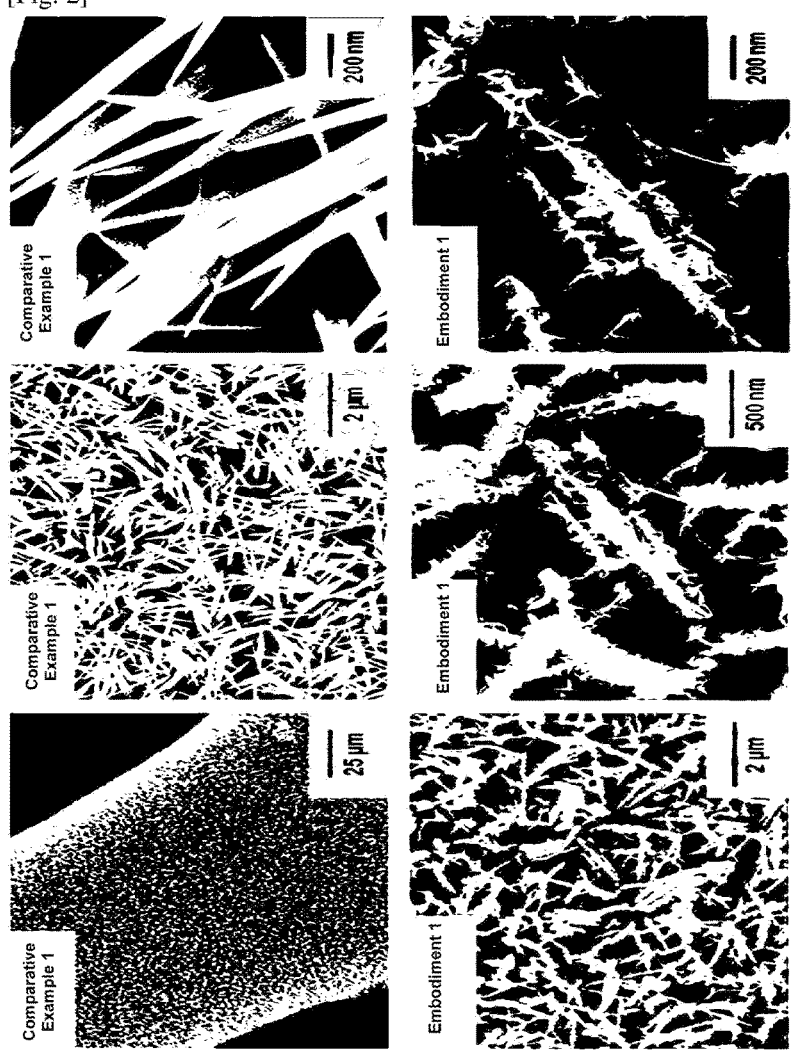

[Fig. 3]
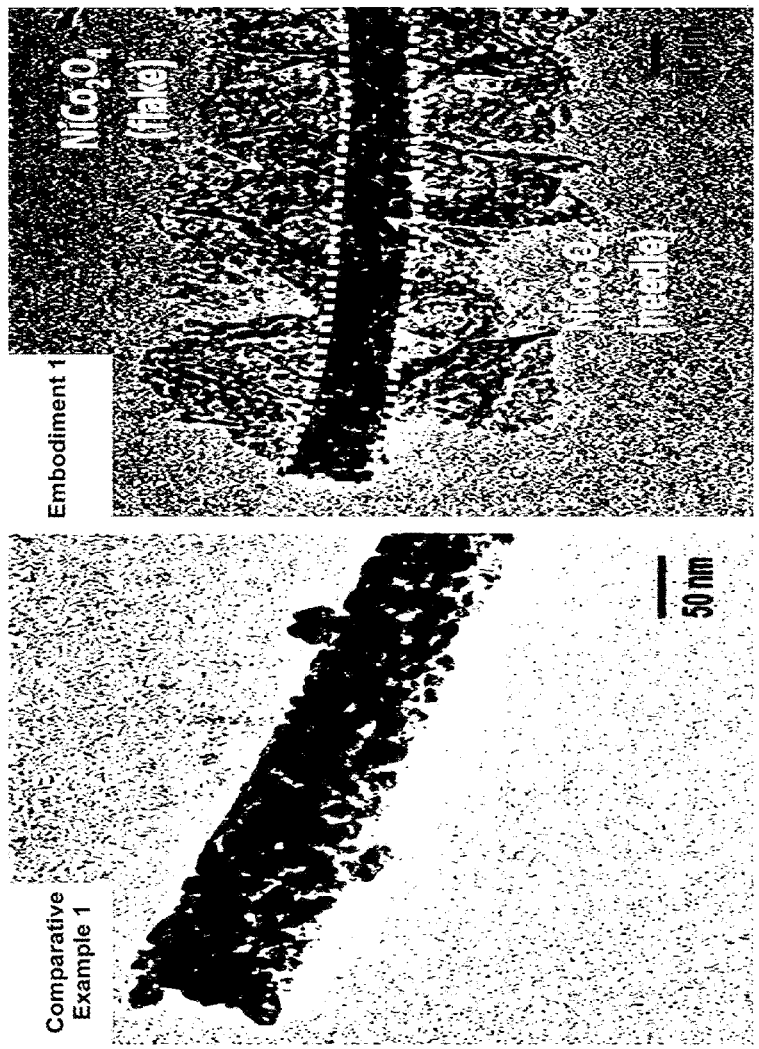
[Fig. 4]
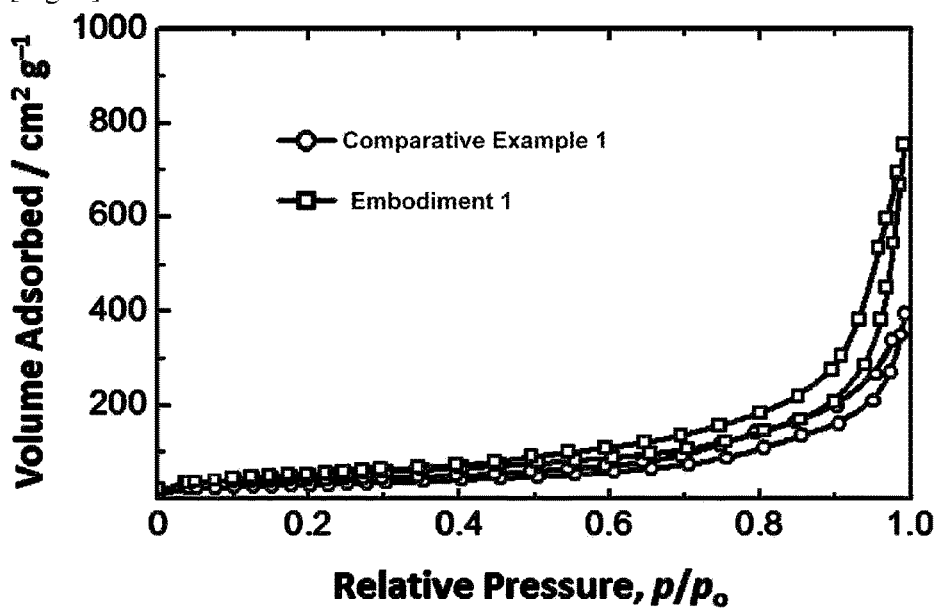

[Fig. 5]
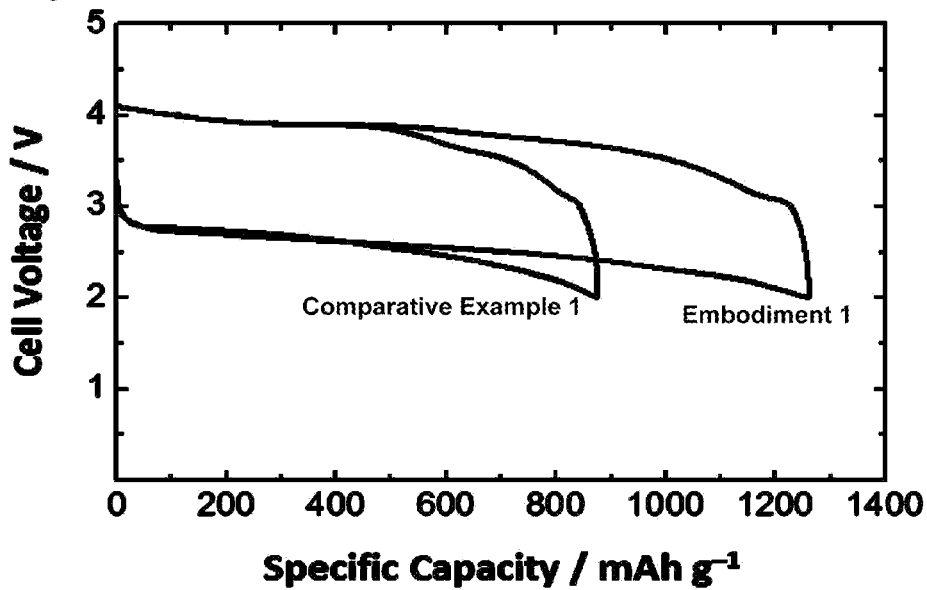
[Fig. 6]
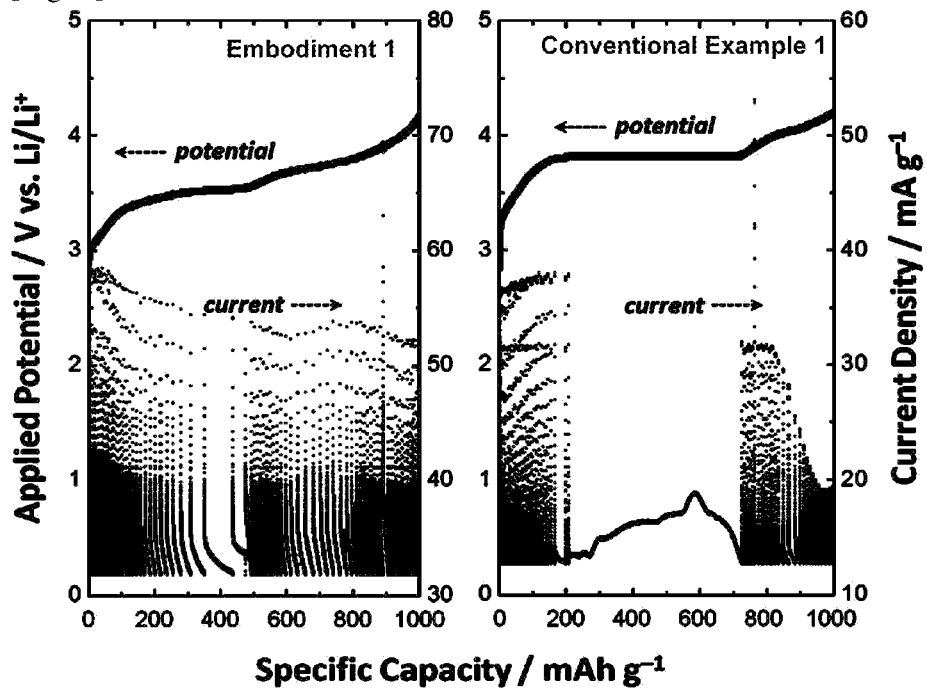

CATHODE FOR METAL-AIR BATTERY, METHOD OF MANUFACTURING THE SAME, AND METAL-AIR BATTERY COMPRISING THE SAME

TECHNICAL FIELD

The present invention relates to cathodes for metal-air batteries, methods for manufacturing the same, and metal-air batteries including the same, and more specifically, to cathodes for metal-air batteries that have a higher capacity and lower charge voltage, methods for manufacturing the same, and metal-air batteries including the same.

DISCUSSION OF RELATED ART

The metal (lithium)-air battery means a battery that employs a metal, such as lithium (Li), as its anode and oxygen ($O_2$) in the air as its cathode active material and is a brand-new energy storage means that may replace existing lithium ion batteries. At the anode of a metal-air battery lithium is oxidated/reduced while at the cathode air, coming in from the outside, is oxidated/reduced. Such metal-air battery is a battery system where secondary battery and fuel cell battery techniques come together. The theoretical energy density of the lithium-ion battery is 11,140 Wh/kg that is much higher as compared with other secondary batteries.

A lithium-air battery typically consists of an anode, a cathode, and an electrolyte and separator between the anode and cathode. Typically, components of the cathode include porous carbon and a binder. However, the carbon material reacts with lithium peroxide ($Li_2O_2$) while the lithium-air battery is discharged and accelerates the decomposition action of the organic electrolyte, leaving a by-product such as lithium carbonate ($Li_2CO_3$).

It is also known that the binder added upon manufacture of the cathode is decomposed by reaction with lithium peroxide. Thus, the charge voltage of the lithium-air battery shows very low charge/discharge energy efficiency and very high charge voltage and suffers from short lifespan due to the by-product steadily accumulated during cycle.

Therefore, there is a need for development cathodes for metal (lithium)-air batteries that may reduce charge voltage while increasing capacity without adding carbon and a binder.

Prior Documents

Korean Patent Application Publication No. 2014-0105100
Japanese Patent Application Publication No. 2014-086256

SUMMARY

The present invention aims to provide cathodes for metal-air batteries that do not contain carbon or binders considering the issues of the prior art.

Another object of the present invention is to provide cathodes for metal-air batteries having higher capacity and lower charge voltage.

The present invention aims to provide a method for manufacturing cathodes for metal-air batteries and metal-air batteries having the cathodes.

To achieve the above objects, according to the present invention, there is provided a cathode for a metal-air battery comprising: a needle-shaped core including two or more species of metals selected from the group consisting of nickel, cobalt, manganese, zinc, iron, copper, and chrome, or a cobalt oxide; and a flake-shaped shell including an oxide containing two or more species of metals selected from the group consisting of nickel, cobalt, manganese, zinc, iron, copper, and chrome or a cobalt oxide.

The core and the shell may be formed on a porous support.

The porous support may include stainless steel or nickel.

According to the present invention, there is provided a method for manufacturing a cathode for a metal-air battery, the method comprising: a first step of preparing a first mixed solution by mixing a transmission metal nitrate (S1) with distilled water; a second step of soaking the porous support in the first mixed solution prepared in the first step and hydrothermally treating the porous support; a third step of drying and performing primary thermal treatment on the hydrothermally treated porous support to form a needle-shaped metal oxide: a fourth step of preparing a second mixed solution by mixing a transmission metal nitrate (S2) with distilled waters, and a fifth step of soaking the needle-shaped metal oxide in the second mixed solution, electroplating, and secondarily thermal-treating to coat a flake-shaped metal oxide on the needle-shaped metal oxide.

Preferably, the concentration of the transmission metal nitrate (S1) dissolved in the distilled water is 0.05 mM to 10 mM.

As the transmission metal, one or two or more species of metals selected from the group consisting of cobalt, nickel, manganese, and zinc may be used.

The needle-shaped metal oxide and the flake-shaped metal oxide may be formed in a dual structure including a core and a shell.

The porous support may include stainless steel or nickel.

In the second step, the hydrothermal treatment is preferably performed at 110° C. to 150° C. for five to twelve hours.

In the third step, the primary thermal treatment is preferably performed at 250° C. to 400° C. for one to five hours.

Preferably, the concentration of the transmission metal nitrate (S2) dissolved in the distilled water in the fourth step is 10 mM to 100 mM.

Here, the electroplating, in the fourth step is preferably performed at −0.1V to −1.0V for one to ten minutes.

In the fifth step, the secondary thermal treatment is preferably performed at 250° C. to 400° C. for one to five hours.

The needle-shaped metal oxide may include one or two or more species of metals selected from the group consisting of cobalt, nickel, manganese, and zinc.

The flake-shaped metal oxide may include one or two or more species of metals selected from the group consisting of cobalt, nickel, manganese, and zinc.

According to the present invention, there is provided a catalyst for a metal-air battery manufactured by the method for manufacturing a cathode for a metal-air battery.

According to the present invention, there is provided a metal-air battery including the cathode for a metal-air battery; an anode including a lithium or lithium alloy active material; an electrolyte; and a separator disposed between the cathode and the anode.

The electrolyte may include an organic solvent and a lithium salt.

The organic solvent may include one or two or more species of materials selected from the group consisting of propylene carbonate, ethylene carbonate, fluoroethylene carbonate, diethyl carbonate, ethyl methyl carbonate, methyl propyl carbonate, butylene carbonate, benzonitrile, acetonitrile, tetrahydrofuran. 2-methyltetrahydrofuran, γ-butyrolactone, dioxolane, 4-methyldioxolane, N,N-dimethyl formamide, dimethyl acetamide, dimethyl sulfoxide, dioxane, 1,2-dimethoxyethane, sulfolane, dichloroethane, chlorobenzene, nitrobenzene, dimethyl carbonate, methyl ethyl carbonate, diethyl carbonate, methyl propyl carbonate, methyl isopropyl carbonate, ethyl propyl carbonate, dipropyl carbonate, dibutyl carbonate, diethylene glycol, dimethyl ether, dimethyl glycol, dimethyl tri-glycol, and dimethyl tetra-glycol.

The lithium salt as used may be one or two or more species of materials selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (here, x and y are natural numbers), LiCl and LiI.

The separator may include one or two or more species of materials selected from the group consisting of glass fiber, polyester, Teflon, polyethylene, polypropylene, and polytetrafluoroethylene (PTFE).

According to the present invention, the metal-air battery may increase capacity and reduce charge voltage by employing an oxide cathode having a core-shell dual structure.

BRIEF DESCRIPTION OF THE DRAWINGS

FIG. 1 is a view illustrating the X-ray diffraction patterns of the cathodes produced according to comparison example 1 and embodiment 1.

FIG. 2 is a view illustrating the photos taken by a scanning electron microscope of the cathodes produced according to comparison example 1 and embodiment 1.

FIG. 3 is a view illustrating the photos taken by a transmission electron microscope of the cathodes produced according to comparison example 1 and embodiment 1.

FIG. 4 is a view illustrating nitrogen adsorption/desorption isothermal curves measured at the cathodes produced according; to comparison example 1 and embodiment 1.

FIG. 5 is a view illustrating charge/discharge curves of the lithium-air batteries produced in embodiment 1 and comparison example 1.

FIG. 6 is a view illustrating the PITT charge curves of the lithium-air batteries according to embodiment 1 and conventional example 1.

DESCRIPTION OF EXEMPLARY EMBODIMENTS

Hereinafter, the present invention is described in detail. Relevant known configurations or functions may be excluded from the description of the present invention.

The terms used herein should be interpreted not in typical or dictionary definitions but to comply in concept with the technical matters of the present invention.

The configurations disclosed in the specification and the drawings are mere examples and do not overall represent the technical spirit of the present: invention. Therefore, various changes may be made thereto, and equivalents thereof also belong to the scope of the present invention.

According to the present invention, an oxide-based dual-structure cathode of a metal-air battery includes a needle-shaped core containing a transition metal oxide and a flake-shaped shell coating the core. As such, the core-shell structure may lead to a reduction in the charge voltage of the metal-air battery as well as the taking of the good capacity characteristics of the transition metal oxide.

The present invention may apply to metal-air batteries, such as lithium-air batteries, sodium-air batteries, magnesium-air batteries, aluminum-air batteries, or calcium-air batteries.

Here, the transition as used may be one or two or more species of metals selected from the group consisting of nickel, cobalt, manganese, zinc, iron, copper, and chrome, or cobalt oxide. Here, the core may have a needle shape, and the shell may have a flake shape.

Further, according to the present invention, the cathode for a metal-air battery may be produced without adding carbon or binder.

According to the prior art, the carbon in the cathode provides a pathway for electrons traveling, but according to the present invention, lack of carbon may increase cathode resistance. However, the oxide for producing the cathode is directly grown/coated on a porous support, thereby reducing cathode resistance.

According to the present invention, the cathode for a metal-air battery may be produced by a manufacturing method including the following steps.

First step: Mix a transmission metal nitrate (S1) with distilled water to prepare a first mixed solution Second step: Soak a porous support in the first mixed solution for hydrothermal treatment Third step: Manufacture a needle-shaped metal oxide by drying the hydrothermally-treated porous support and performing primary thermal treatment Fourth step: Mix a transmission metal nitrate (S2) with distilled water to prepare a second mixed solution Fifth step: Soak the needle-shaped metal oxide in the second mixed solution and perform electroplating and secondary thermal treatment on the same to coat a flake-shaped metal oxide on the needle-shaped metal oxide Hereinafter, a method for manufacturing a cathode for a metal-air battery according to the present invention is described in detail step by step.

A transmission metal nitrate (S1) is mixed with distilled water to prepare a first mixed solution Here, a transmission metal oxide may apply without respect to its structure or composition. Preferably, one or two or more species of spinel-structural transmission metal oxides may be used which are selected from the group consisting of cobalt, nickel, manganese, and zinc.

Next, a porous support is soaked in the first mixed solution and is subjected to hydrothermal treatment The porous support may be manufactured in the form including stainless steel or nickel. Here, since the oxide for manufacturing the cathode is directly grown up and coated on the porous stand, the electrode resistance may lessen.

The hydrothermal treatment is preferably performed at 110° C. to 150° C. for five to twelve hours. Departing from the temperature and time range may inhibit the needle-shaped structure from forming, and this is not preferable.

Preferably, the concentration of the transmission metal nitrate (S1) dissolved in the distilled water is 0.05 mM to 10 mM. Excess of the upper limit of the range may cause the resultant structure to have a cohesive form rather than a needle shape, and being less than the lower limit of the range may lead to a prolonged formation time. This is not preferable.

Then, the hydrothermally treated porous stand is washed and dried, and is then subjected to primary thermal treatment, thereby forming a needle-shaped metal oxide. For the washing and drying, a typically practiced way may be used.

Preferably, the primary thermal treatment is performed at 250° C. to 400° C. for one to five hours. Exceeding the upper limit of the temperature and time range may cause the metal oxide to cohere, while being less than the lower limit thereof may inhibit the formation of a crystalline metal oxide. This is not preferable.

A transmission metal nitrate (S2) is mixed with distilled to prepare a second mixed solution. Preferably here, as the transmission metal nitrate (S2), the same type of metal as that used for the transmission metal nitrate (S1) is used. However, the present invention is not limited thereto.

Here, the concentration of the transmission metal nitrate (S2) dissolved in the water is 10 mM to 100 mM. Excess of the upper limit of the range may cause the resultant structure to have a cohesive form rather than a needle shape, and being less than the lower limit of the range may lead to a prolonged formation time. This is not preferable.

The steps of preparing the first mixed solution and the second mixed solution may be performed sequentially or simultaneously. It, however, is preferable to sequentially perform the step of preparing the needle-shaped metal oxide and then the step of coating the flake-shaped metal oxide on the needle-shaped metal oxide.

Lastly, the needle-shaped metal oxide is soaked in the second mixed solution and is subjected to electroplating and secondary thermal treatment, so that a flake-shaped metal oxide is coated on the needle-shaped metal oxide The needle-shaped metal oxide and the flake-shaped metal oxide may be formed in a dual structure including a core and a shell.

As the metals formed in the needle shape and flake shape, a transmission metal having a spinel structure may be used, which are one or two or more species of metals selected from the group consisting of nickel, cobalt, manganese, zinc, iron, copper, and chrome, or a cobalt oxide.

Here, the electroplating is preferably performed at −0.1V to −1.0V for one to ten minutes. Departing from the upper limit of the voltage and time range may inhibit the formation of the flake shape, and this is not preferable.

Preferably, the secondary thermal treatment is performed at 250° C. to 400° C. for one to five hours. Exceeding the upper limit of the temperature and time range may cause the metal oxide to cohere, while being less than the lower limit thereof may inhibit the formation of a crystalline metal oxide. This is not preferable.

According to the present invention, a metal-air battery employs the cathode. The metal-air battery may be manufactured by the following method.

The metal-air battery includes a cathode for the metal-air battery; an anode including a lithium or lithium alloy active material; an electrolyte; and a separator disposed between the cathode and the anode.

The electrolyte may include an organic solvent and a lithium salt.

The organic solvent may include one or two or more species of materials selected from the group consisting of propylene carbonate, ethylene carbonate, fluoroethylene carbonate, diethyl carbonate, ethyl methyl carbonate, methyl propyl carbonate, butylene carbonate, benzonitrile, acetonitrile, tetrahydrofuran, 2-methyltetrahydrofuran, γ-butyrolactone, dioxolane, 4-methyldioxolane, N,N-dimethyl formamide, dimethyl acetamide, dimethyl sulfoxide, dioxane, 1,2-dimethoxyethane, sulfolane, dichloroethane, chlorobenzene, nitrobenzene, dimethyl carbonate, methyl ethyl carbonate, diethyl carbonate, methyl propyl carbonate, methyl isopropyl carbonate, ethyl propyl carbonate, dipropyl carbonate, dibutyl carbonate, diethylene glycol, dimethyl ether, dimethyl glycol, dimethyl tri-glycol, and dimethyl tetra-glycol.

The lithium salt as used may be one or two or more species of materials selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (here, x and y are natural numbers), LiCl and LiI.

The separator may split the cathode and the anode from each other. Any one commonly used for lithium batteries may be used as the separator. In particular, it is preferable to use a separator having a low resistance to the movement of ions of the electrolyte and capable of better impregnation.

A material adopted as the separator may be selected from the group consisting of glass fiber, polyester, Teflon, polyethylene, polypropylene, and polytetrafluoroethylene (PTFE), and the separator may be used in the form of non-woven or woven fabric. Specifically, a separator as used may be a windable separator, such as polyethylene or polypropylene or a separator where an organic electrolyte may be more readily impregnated.

Then, an electrolyte-impregnated separator is placed between the cathode plate and the anode plate, forming a metal-air battery structure.

The metal-air battery is appropriate for high-capacity purposes such as use in electric vehicles and may also be used in hybrid vehicles by combining with existing internal-combustion engines, fuel cells, or super capacitors. Further, the metal-air battery may also be used for all other purposes requiring high capacity such as mobile phones or portable computers.

The present invention is now described in further detail in connection with embodiments thereof. The embodiments are provided merely to specifically describe the present invention, and it is obvious to one of ordinary skill in the art that the scope of the present invention is not limited to the embodiments.

COMPARISON EXAMPLE 1

Preparation of Cathode

A nickel nitrate, a cobalt nitrate, and urea were dissolved in distilled water, forming a mixed solution. Here, the concentration of the nickel nitrate relative to the distilled water was 0.2 mM, the concentration of the cobalt nitrate relative to the distilled water was 0.4 mM, and the concentration of the urea relative to the distilled water was 0.75 mM. Nickel foam was selected as the porous support. After soaking the nickel foam in the solution, a resultant product obtained by hydrothermal treatment at 120° C. for nine hours was washed and dried. Thereafter, the resultant product was thermally treated by subjecting it to contact dried air for three hours and was then cooled in the furnace, thereby forming a nickel-shaped nickel-cobalt oxide (core).

(Manufacture of Metal-Air Battery)

A lithium-air battery was produced using the cathode, a lithium opposite electrode, a glass fiber separator, and an electrolyte having 1M Li $(CF_3SO_2)_2N$ dissolved in dimethyl tetra-glycol.

[First Embodiment]

A nickel nitrate and a cobalt nitrate were dissolved in distilled water, forming a mixed solution. Here, the concentration of the nickel nitrate relative to the distilled water was 33 mM, and the concentration of the cobalt nitrate relative to the distilled water was 66 mM. −0.5 V voltage was applied for five minutes using nickel foam coated with the needle-shaped nickel-cobalt oxide (core) produced according to comparison example 1 as an operation electrode, a platinum mesh as an opposite electrode, and an Ag/AgCl electrode as a reference electrode. Thereafter, the resultant product was thermally treated by subjecting it to contact dried air for two hours and was then cooled in the furnace, thereby obtaining a cathode where a flake-shaped nickel-cobalt oxide (shell) has been coated on the needle-shaped core. A lithium-air battery was manufactured by the same method as in comparison example 1.

CONVENTIONAL EXAMPLE 1

Slurry was produced by mixing carbon black (Denka Black) with a PVdF binder in a weight ratio of 80:20. The slurry was coated on a nickel mesh, thereby forming a cathode. It was dried at 80° C. and was then dried under a vacuum at 120° C. thereby producing a cathode plate. A lithium-air battery was manufactured by the same method as in comparison example 1.

ASSESSMENT EXAMPLE 1

X-ray Diffraction Test

An X-ray diffraction test was conducted to grasp the crystal structure of the cathodes manufactured according to comparison example 1 and embodiment 1. A result of the test is shown in FIG. 1. As evident from FIG. 1, the cathodes produced according to comparison example 1 and embodiment 1 are constituted of spinel-structural $NiCo_2O_4$. It can be verified that no second phases or impurities are formed at both the cathodes produced.

ASSESSMENT EXAMPLE 2

Scanning Electron Microscope (SEM) Test

A scanning electron microscope (SEM) test was conducted to grasp the shape of the cathodes manufactured according to comparison example 1 and embodiment 1. A result of the test is shown in FIG. 2. As evident from FIG. 2, the cathode produced according to comparison example 1 is constituted of a nickel-cobalt oxide. It may also be verified that the cathode produced according to embodiment 1 has the needle-shaped nickel-cobalt oxide evenly coated on the flake-shaped nickel-cobalt oxide.

ASSESSMENT EXAMPLE 3

Transmission Electron Microscope (TEM) Test

A transmission electron microscope (TEM) test was conducted to grasp the shape and microstructure of the cathodes manufactured according to comparison example 1 and embodiment 1. A result of the test is shown in FIG. 3. As evident from FIG. 3, it can be verified that multiple nano air holes are present on the surface or inside of the needle-shaped nickel-cobalt oxide (core). It may also be verified that it has a polycrystalline structure constituted of small crystalline particles with a size of 2 nm to 5 nm or less. It may be verified that the cathode produced according to embodiment 1 has a core-shell dual structure where the needle-shaped nickel-cobalt oxide is evenly coated on the flake-shaped nickel-cobalt oxide.

ASSESSMENT EXAMPLE 4

Brunauer-Emmett-Teller (BET) Test

A BET test was performed using an absorption/desorption reaction of nitrogen to measure the surface area of the cathodes produced according to comparison example 1 and embodiment 1. A result of the test is shown in FIG. 4. The surface area of the cathodes calculated based on the result shown in FIG. 4 is summarized as in Table 1. It may be verified that the cathode produced according to embodiment 1 has the needle-shaped nickel-cobalt oxide evenly coated on the flake-shaped nickel-cobalt oxide or manganese oxide and thus has an increased surface area.

TABLE 1

Surface area of cathodes produced as per comparison example 1 and embodiment 1

| | Surface area |
|---|---|
| Comparison Example 1 | 111 |
| Embodiment 1 | 180 |

ASSESSMENT EXAMPLE 5

Charge/Discharge Test

A charge/discharge test was conducted using the lithium-air batteries produced according to comparison example 1 and embodiment 1. Specifically, a 50 mA/g constant current was applied to discharge up to 2.0V, and then, a 50 mA/g constant current was applied to charge up to 4.2V. Here, the density of the applied current was calculated based on the weight of the cathode.

FIG. 5 illustrates charge discharge curves of the lithium-air batteries produced in embodiment 1 and comparison example 1. Here, the capacity was calculated based on the weight of the cathode. As evident from embodiment 1, in case the flake-shaped nickel-cobalt oxide is coated on the needle-shaped nickel-cobalt oxide to thereby lead to a core-shell dual structure, the capacity is increased by 9. Table 2 summarizes the discharge capacity of the lithium-air batteries produced according to comparison example 1 and embodiment 1.

TABLE 2

Discharge capacity of lithium-air batteries produced as per comparison example 1 and embodiment 1

| | Discharge capacity |
|---|---|
| Comparison Example 1 | 876 |
| Embodiment 1 | 1,261 |

FIG. 6 illustrates charge curves of the lithium-air batteries measured by the Potentiostatic Intermittent Titration Technique (PITT). Specifically, a 50 mA/g constant current was applied to discharge until the capacity reaches 1,000 mAh/g, and then, a 12 mV constant voltage was sequentially applied to charge up to 4.2V. The PITT provides the benefit that a charge voltage closer to the equilibrium state may be accurately measured by applying a tiny voltage over the general constant current recharging process. As shown in FIG. 6, the lithium-air battery produced as per embodiment 1 presents a lower charge voltage as compared with conventional example 1.

Although preferred embodiments of the present invention have been shown and described in connection with the drawings and particular terms have been used, this is to provide a better understanding of the present invention and is not intended to limit the scope of the present invention.

It is apparent to one of ordinary skill in the art that various changes may be made thereto without departing from the scope of the present invention.

What is claimed is:

1. A cathode for a metal-air battery, comprising:
   a needle-shaped core including two or more species of metals selected from the group consisting of nickel, cobalt, manganese, zinc, iron, copper, and chrome, or a cobalt oxide; and
   a flake-shaped shell including an oxide containing two or more species of metals selected from the group consisting of nickel, cobalt, manganese, zinc, iron, copper, and chrome or a cobalt oxide.

2. The cathode of claim 1, wherein the core and the shell are formed on a porous support.

3. The cathode of claim 2, wherein the porous support includes stainless steel or nickel.

* * * * *